United States Patent Office 3,151,989
Patented Oct. 6, 1964

3,151,989
FOOD PACKAGED IN A POLYAMIDE FILM
William Sacks, Chicago Heights, Ill., William N. Stoops, Charleston, W. Va., and William F. Underwood, Oak Park, Ill., assignors to Union Carbide Corporation, a corporation of New York
No Drawing. Original application July 13, 1959, Ser. No. 826,486. Divided and this application Aug. 3, 1961, Ser. No. 136,124
1 Claim. (Cl. 99—171)

This invention relates to a novel plastic film food package said film being extruded from a polyamide containing the recurring structural unit —$HN(CH_2)_6CO$—.

Films made from polyamides are, in general, known in the art. Polyamides obtained by polymerizing omega amino acids, such as caprolactam and 11-amino undecanoic acid and polyamides obtained by polymerizing adipic acid and hexamethylene diamine (nylon 6,6) have been made into film.

However, these films are not entirely satisfactory for use in food packaging of meats, cheese, fresh frozen foods, frozen poultry and the "cook-and-serve" applications wherein the food item is stored frozen in a package which can later be immersed in boiling water to cook said item. This is because they have either too high an oxygen permeability (poly 11-amino undecanoic acid) too high a moisture permeability (poly epsilon caprolactam) or are hazy and require high temperatures to heat seal (nylon 6,6). In addition, when poly epsilon caprolactam is melt extruded into film, a polymermonomer equilibrium results and water soluble caprolactam is formed in the film. The monomer cannot be readily removed from the film. Thus, when the film is used as a wrapping or packaging material, the monomer tends to migrate and contaminate the contents.

Present commercially available polyamides having the defects set forth above are impractical for food packaging.

It is accordingly an object of this invention to provide a novel food package made of a polyamide film having low oxygen and moisture vapor permeability and being heat sealable at relatively low temperatures.

It is a further object to make such a film from a polyamide having recurrent structural groups having the general formula —$HN(CH_2)_6CO$— and wherein the polyamide has a reduced viscosity preferably in the range between about 1.6 and 2.0.

Other objects and advantages will be apparent from the following description and examples of the invention.

The objects of the invention are accomplished in general by a food package capable of being successively stored at temperatures below 0° F. and immersed in boiling water, said package comprising food stuff enclosed in a container of a polyamide film, said polyamide consisting essentially of the recurring structural unit

—$HN(CH_2)_6CO$— and having a reduced viscosity of between about .7 and 3.0, said package being further characterized by good heat sealability, good clarity, and low oxygen and water vapor permeability.

Applying the approved numerical system employed for expressing the chemical composition of the polyamides, the polyamide that this invention is concerned with can be called nylon-7.

Film made from a polyamide containing the recurring structural unit —$HN(CH_2)_6CO$— is ideally suited for use in food packaging due to its low moisture vapor and low oxygen permeability. This is highly desirable since the low oxygen permeability will prevent oxidative decomposition and in the packaging of meats, which are to be stored under fluorescent lights in retail display cases, and minimize discoloration and decomposition, and the low moisture vapor permeability minimizes weight losses in high moisture content products.

Further, the low haze value, for clear see-through packaging; the dimensional stability at temperatures over 100° C. for "cook-and-serve" packaging; the heat sealability for ready conversion to unit containers; the printability for merchandising; and the flexibility at low temperatures for frozen food storage, make this film unique and highly useful for wrapping and packaging.

It has not heretofore been commercially possible to produce high molecular weight polyamides containing recurring structural units of the general formula

—$HN(CH_2)_6CO$— which would be suitable for extrusion into films or for molding applications.

Nylon-7 polymers suitable for the production of films useful in the present invention can be prepared by heating an ester of 7-aminoheptanoic acid at atmospheric pressure in the presence of water to produce a prepolymer, which is a solid at room temperature, and which is a mixture containing a small amount of unreacted ester, 7-aminoheptanoic acid and low molecular weight polymer, as identified by infra-red spectroscopy. This prepolymer mixture can then be readily condensed to high molecular weight resin at polyamide-forming temperatures in the absence of any catalyst, and at atmospheric pressures. In producing the high molecular weight polyamide, the water and formed alcohol are removed from the prepolymer by distillation, and the prepolymer is then further heated at polyamide-forming temperatures to produce the high molecular weight polyamide.

In preparing the prepolymer, the initial mole ratio of ester to water charged may vary from about 1 to 1 up to about 1 to 30 or higher. The preferred mole ratios are within the range of about 1 to 2.5 to about 1 to 15, with mole ratios of about 1 to 10 the most preferred. While the higher mole ratios are not detrimental to the production of a satisfactory high molecular weight polyamide, they are not the preferred since they would require excessively large equipment and a longer distilling time to remove the water after the prepolymer has been formed.

The prepolymer can be formed by heating the ester-water mixture at temperatures below about 200° C., preferably from about 95° C. to about 150° C., while passing a gentle stream of an inert gas, such as argon, nitrogen, helium or carbon dioxide, through the molten reaction mixture. During this stage of the process some of the water and formed alcohol distill out of the reaction vessel. Ordinarily, the time required for the formation of the prepolymer is from about one-half to about three hours when the prepolymer is prepared at temperatures of from about 95° C. to about 120° C. Shorter times suffice if the temperature is slowly raised from 95° C. directly to about 200° C. After the readily polymerizable prepolymer mixture has been prepared, the temperature is raised to about 200° C. and all of the water, as well as the alcohol which formed is distilled from the reaction mixture.

After the water and alcohol have been removed at temperatures up to about 200° C., the molten prepolymer mixture, which is free of added water, is further heated to polyamide-forming temperatures above about 240° C. Heating at such elevated temperature, preferably from about 260° C. to about 280° C., is then continued until a high molecular weight polyamide is produced. During this polyamide-forming heating period, the flow of inert gas is increased to obtain improved agitation and alcohol-water removal. The optimum amount of inert gas (liters per minute) bubbled through the melt depends very much upon the reactor dimensions and batch size; therefore, limits cannot specifically be set out. However, it can be stated generally that the greater the quantity of inert gas passed through the melt, the shorter is the poly-condensation time.

At any preferred moment of the process there may be introduced viscosity stabilizers, such as benzoic acid, stearic acid, para-toluic acid, adipic acid, sebacic acid, glutaric acid, pimelic acid, and the like, as well as the esters thereof. Among other viscosity stabilizers there may also be mentioned ethyl 6-cyanohexanoate, ethyl 7-benzamidoheptanoate, ethyl 7 - acetamidoheptanoate, ethyl 7-toluamidoheptanoate and the like. The viscosity stabilizers hereinbefore mentioned are added to the reactants to insure obtaining a polyamide having a particular reduced viscosity that will not change upon further heating. Other additives, such as pigments, which do not function as catalysts or serve to impede the polymerization, can also be added.

In producing a satisfactory prepolymer at atmospheric pressure, which will be suitable for the production of high molecular weight nylon-7 useful for film extrusion and molding purposes, it has been found that certain esters of 7-aminoheptanoic acid are preferred, since not all of the esters of 7-aminoheptanoic acid produce a readily polymerizable prepolymer at atmospheric pressure which can then be heated at polyamide-forming temperatures to produce a commercially satisfactory product within a reasonable time. It has been found that the linear alkyl or the linear aliphatic esters of 7-aminoheptanoic acid containing from 1 to about 8 or more carbon atoms in the aliphatic chain, preferably from 2 to about 6, or mixtures thereof, are suitable for use. It has also been found that 1-phenylethyl 7-aminoheptanoate will also produce a satisfactory prepolymer at atmospheric pressure. Illustrative of the linear aliphatic esters which can be used in this invention are the ethyl, n-propyl, n-butyl, n-hexyl, n-octyl, and the like esters of 7-aminoheptanoic acid, and mixtures thereof.

The polyamides produced by this process have a reduced viscosity up to about 3. However, the polymerization may be terminated when the polyamide has reached the desired molecular weight, which then expressed in reduced viscosity is normally between about 0.7 to about 3.0. The nylon-7 preferred for use as a film extruding resin has a reduced viscosity range preferably from about 1.1 to about 2.0 and optimumly from about 1.6 to 2.0. Reduced viscosities lower than 1.1 are more fluid and more difficult to melt extrude. When the reduced viscosities are above 2.0, there is a greater tendency for gel particles to occur, giving nonuniformity in the film.

The reduced viscosity $I_R$, which is a measure of the degree of polymerization, may be defined by the equation:

$$I_R = \frac{\frac{\Delta N}{N_o}}{C}$$

wherein $\Delta N$ is the difference between the flow-time of the solution and the flow-time of the solvent, $N_o$ stands for flow-time of the solvent and $C$ is the concentration of the resin in solution in grams per 100 ml. of solution. Measurements were made at 30° C. using a mixture of phenoltetrachloroethane (3:2 ratio) as solvent at a concentration of 0.2 gram of resin per 100 ml. of solution.

The term reduced viscosity as referred to in the specification and the claims is understood to mean reduced viscosity when measured under the above stated conditions.

A typical preparation of a nylon-7 polymer suitable for melt-extrusion into film form is hereinafter described.

PREPARATION OF NYLON-7 POLYMER

A solution of 200 parts of ethyl 7-aminoheptanoate and 200 parts of water was heated at 100° to 110° C. for three hours while passing a gentle stream of nitrogen (0.1 liter/min.) through the melt by means of a fine gas sparger fixed at the bottom of the reactor. The prepolymer produced in the reaction flask was a mixture of ethyl 7-aminoheptanoate, 7-aminoheptanoic acid and low molecular weight polyamides. The temperature of the reaction mixture was gradually raised to 200° C. over a 2 hour period to distill off the water and ethanol. The prepolymer in the reaction flask was then heated to 260° C. and converted to high molecular weight nylon-7 by heating at 260° C. for two hours while passing nitrogen, at the rate of about two to three liters per minute, through the melt. The polymer produced was a white solid, and had a reduced viscosity of 1.69 and melted at 224° C.

The polyamide film of this invention can be made by extruding the polymeric material by the method described in Fuller, U.S. Patent 2,461,975. That patent describes a tubular extrusion process wherein a thermoplastic polymer in the molten condition is extruded through an annular die in the form of a seamless tubing, and as the tubing is withdrawn from the die and while it is still in the plastic formative state, the tubing is inflated to a predetermined diameter. Cooling gases are blown onto the outer surface of the tubing to set the polymeric material at the predetermined diameter. Film thicknesses of less than 0.5 mils to 5 mils or higher can be obtained in this manner.

The film can also be obtained by melt extruding the polymer through a slot orifice into a liquid bath or onto a chilled surface or through an annular orifice into quenching bath or by casting a solution of the polymer or by any other of the known techniques.

In carrying out the extruding process of the Fuller patent with respect to this invention the nylon-7 is introduced into the extruder and the feed screw rotated at a predetermined speed whereby the thermoplastic in the molten state is extruded through the annular orifice of an appropriately selected die. The extruded material which is in the form of seamless tubing is then passed between the nip of two squeeze rolls. Air is introduced into the portion of the tubing extending between the die and nip of the squeeze rolls in the amount required to inflate the tubing to the desired diameter. This is determined by increasing or decreasing the amount of air as is indicated upon measurement of the flat width of the collapsed tubing. The other conditions of the processes are correlated to produce the desired product.

It is to be noted that in the process hereinbefore generally described, the internal air pressure, the volume of external air, and the diameter of the die, are balanced against each other (all the other variables being maintained constant) as is necessary to produce tubing of predetermined characteristics.

In general, to melt extrude nylon-7 film by the inflated bubble technique as set forth herein, the temperature of the die should be preferably between about 230° C. and 270° C. and the melt temperature preferably between about 225° C. and 260° C. However, the optimum conditions employed will depend upon the reduced viscosity of the polymer used and upon the extrusion rate desired. The extrusion conditions also depend upon the nature of the particular polymer used. The cooling was done at room temperature. However, sub-room temperature cooling air could also be used.

The following examples illustrated the process for preparing a nylon-7 film.

*Example 1*

A tubular film was made from poly 7-amino heptanoic acid by the method described in U.S. Patent 2,461,975, using a 2½ inch diameter annular die, a die temperature of 227–238° C. and producing seamless tubing having a flat width of eight inches and a thickness of one mil. The film was clear, had a low oxygen and moisture permeability and was stable to about 150° C. and was flexible at temperatures of −17.7° C. and below.

The physical properties of the film are listed below.

Table I

| Film Thickness, mils | | 1.1 |
|---|---|---|
| Tensile Strength, pounds/sq. inch | Machine Direction | 7,609 |
| | Transverse Direction | 5,738 |
| Elongation at Break, percent | Machine Direction | 300 |
| | Transverse Direction | 215 |
| Tear Strength, g./mil | Machine Direction | 26 |
| | Transverse Direction | 27 |
| Haze, percent | | .6 |
| Moisture Permeability, g./100 sq. in./24 hrs./mil | | 4.8 |
| Oxygen Permeability (cc./100 sq. in./24 hrs./mil) | | 3 |

*Example 2*

A poly 7-amino heptanoic acid film was prepared by heating the polymer to 221–255° C. and melt extruding the polymer through a 5 inch slot die into cooled water. No evidence of polymer decomposition was observed over the temperature range of 221–255° C.

The film had the following properties:

Table II

| Film Thickness, mils | | 2.7 |
|---|---|---|
| Tensile Strength, pounds/sq. inch | Machine Direction | 11,900 |
| | Transverse Direction | 6,500 |
| Elongation at Break, percent | Machine Direction | 634 |
| | Transverse Direction | 337 |
| Tear Strength, g./mil | Machine Direction | 29 |
| | Transverse Direction | 37 |
| Haze, percent | | 3 |

The blown film made in the above Example 1 melted at 216° C. There was less than 2% shrinkage after heating the film at 150° C. for 2 minutes in the absence of any restraining forces.

The film of this invention is tough and flexible at low temperatures and is ideally useful for packaging of frozen products. The table below shows the effect of temperature on the impact strength of one mil poly 7-amino heptanoic acid film.

| Temperature, °C. | Impact strength, inch-pounds/mil |
|---|---|
| 25 | 10.3 |
| −10 | 4.1 |
| −30 | 3.4 |

In addition the film can be flexed at −70° C. without cracking.

The following tests were used in determining the physical properties of the films as set forth in the above examples and are referred to elsewhere in the specification.

*Oxygen permeability.*—The oxygen permeability tests on the film were conducted by ASTM Method D–1434–58. The values were recorded in cubic centimeters per 100 square inches per 24 hours per mil.

*Moisture permeability.*—Moisture Vapor transmission measured by the General Foods Method, Modern Packaging, November, 1942.

*Tear strength.*—TAPPI Method T 414M–49 (Tech. Assoc. of Pulp & Paper Industry). Tear strength is recorded in grams per 1/1000 inch film thickness.

*Tensile Strength.*—ASTM Test D882–54T–C; ASTM Standards on Plastics, October 1955, p. 222, Scott Inclined Plane Tensile Strength Tester. A sample 1 inch long by ½ inch wide is used. Tensile strength is given in pounds per square inch based on original cross-section area of the sample.

*Elongation.*—ASTM Test D882–54T–C; ASTM Standards on Plastics, October 1955, p. 222. Determined on same machine and sample as tensile strength.

*Haze.*—ASTM Method D–1002–52.

The impact strength of the film is recorded in inch-pounds per mil thickness, and is obtained from the difference in kinetic energy of a free falling polished steel ball 2.5 inches in diameter and weighing 2.3 pounds and the kinetic energy of the same falling ball interrupted in its fall by a film placed 2.5 feet from the point of release. The kinetic energy is calculated from the time required for the falling ball to interrupt two horizontal light beams vertically spaced and disposed below the film.

Films were also made from poly 11-amino undecanoic acid; poly epsilon caprolactam; and nylon 6,6 obtained from polymerizing adipic acid and hexamethylene diamine and are compared in table below with film made from poly 7-amino heptanoic acid.

Table III

| Polyamide Film | Moisture Permeability, g./100 in.²/ 24 hrs./mil. | Oxygen Permeability, cc./100 in.²/ 24 hrs./mil. | Haze, Percent |
|---|---|---|---|
| Poly 7-amino heptanoic acid | 4.8 | 3 | 6 |
| Poly ε-caprolactam | 17.8 | 6 | 1.7–14 |
| Poly 11-amino undecanoic acid | 3.1 | 49 | 5 |
| Nylon 6,6 (adipic acid) and (Zytel 42) (hexamethylene diamine) | 10.4 | 1 | 22 |

Surprisingly, it has been found that the nylon-7 has both relatively low moisture vapor and low oxygen permeability as contrasted to the other polyamides having one or the other permeability higher. Also, it can be readily seen that the haze value of the nylon 6,6 is extremely high and unsuitable for see-through packaging.

The film of this invention is readily heat sealable. Samples of 1 mil poly 7-amino heptanoic acid film were sealed, using a bar sealer operated at 20 pounds per square inch air pressure and ½ second contact time. At bar temperatures of 425–450° F., seal strengths similar in magnitude to the tensile strength of the film were produced (6.6 lbs./sq. inch). Satisfactory seals have also been obtained, using impulse-type sealers.

It can be readily seen that the low haze and moisture vapor and gas permeability of the poly 7-amino heptanoic acid film coupled with the ready heat sealability, printability, dimensional stability at elevated temperatures and flexibility at temperatures used for storage of frozen food make the films ideally suited for food packaging of cheeses, sliced meats, "cook-and-serve" food products, fresh frozen foods, etc.

The film can be used for packaging food products having moisture contents of 50 to 60% or higher without any substantial weight loss during storage as well as packaging low moisture content products to keep them dry and to prevent decomposition.

Meat products such as frozen poultry, sliced boiled ham, sliced comminuted meats such as bologna, New England sausage, veal sausage, Lebanon bologna, salami etc. can all be successfully packaged in the poly 7-amino heptanoic acid film.

The poly 7-amino heptanoic acid film is also suited for packaging of "cook-and-serve" food products. A method that can be used is to insert the precooked product such as stew, potatoes, goulash, soups, peas, fish, meat, etc., in the open end of a bag made from the film, applying a vacuum to the interior of the bag if desired, sealing the open end, and freezing the bag and contents to storage temperatures of 0° F. to −20° F. and storing the package at said temperature. When it is desired to serve the contents, the entire package is then heated in boiling water for a period of 10 to 20 minutes. The package is then torn open and the hot contents served.

Precooked beef stew was packaged by the method described above in the film of this invention and stored at −6° F. for a period of one month. Thereafter, package and contents were put into boiling water and heated for 20 minutes. The stew could be readily seen through the film, and the film was not damaged in its handling during the storage at −6° F. nor in the heating at 212° F. in boiling water.

It is to be understood that packages of any desired configuration may be made of the nylon-7 film according to the invention and heat sealed at all openings. However, the preferred method of forming such packages is to sever short lengths of tubular extruded film and heat seal first one end, insert the product to be packaged and then heat seal the other end.

There has thus been disclosed and described a novel food packaging film combining unique properties hitherto unavailable in the industry and a method for producing same. While certain embodiments of the invention have been set forth in the specification and examples, it is to be understood that certain modifications and changes could be made by a person skilled in the art without departing from the spirit and scope thereof.

This application is a division of application Serial No. 826,486, filed July 13, 1959, now abandoned.

What is claimed is:

A food package capable of being successively stored at temperatures below 0° F. and immersed in boiling water, said package comprising food stuff enclosed in a container formed of a polyamide film, said polyamide consisting essentially of the recurring structural unit —$NH(CH_2)_6CO$— and having a reduced viscosity of between about .7 and 3.0, said package being further characterized by good heat sealability, good clarity, and low oxygen and water vapor permeability.

References Cited in the file of this patent
UNITED STATES PATENTS

| | | |
|---|---|---|
| 2,071,253 | Carothers | Feb. 16, 1937 |
| 2,252,555 | Carothers | Aug. 12, 1941 |
| 2,699,396 | Francis | Jan. 11, 1955 |
| 2,762,720 | Michel | Sept. 11, 1956 |
| 2,872,760 | Meissner | Feb. 10, 1959 |

UNITED STATES PATENT OFFICE
CERTIFICATE OF CORRECTION

Patent No. 3,151,989                              October 6, 1964

William Sacks et al.

It is hereby certified that error appears in the above numbered patent requiring correction and that the said Letters Patent should read as corrected below.

Column 5, line 34, for "at 216° C." read -- at about 216° C. --; column 8, line 5, for "-NH(CH$_2$)$_6$CO-" read -- -HN(CH$_2$)$_6$CO- --.

Signed and sealed this 16th day of February 1965.

(SEAL)
Attest:

ERNEST W. SWIDER
Attesting Officer

EDWARD J. BRENNER
Commissioner of Patents